United States Patent
Pham

(10) Patent No.: US 8,826,354 B2
(45) Date of Patent: Sep. 2, 2014

(54) METHOD AND SYSTEM FOR TESTING CLOSED CAPTION CONTENT OF VIDEO ASSETS

(75) Inventor: Hung John Pham, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 582 days.

(21) Appl. No.: 12/958,230

(22) Filed: Dec. 1, 2010

(65) Prior Publication Data

US 2012/0143606 A1    Jun. 7, 2012

(51) Int. Cl.
  *H04N 7/173* (2011.01)
  *H04N 11/00* (2006.01)
  *H04N 5/278* (2006.01)
  *G10L 15/26* (2006.01)

(52) U.S. Cl.
  CPC .............. *H04N 5/278* (2013.01); *G10L 15/26* (2013.01)
  USPC ............................. 725/107; 348/466; 348/468

(58) Field of Classification Search
  USPC ................... 725/136, 137, 107; 348/466, 468
  See application file for complete search history.

(56) References Cited

U.S. PATENT DOCUMENTS

| | | | |
|---|---|---|---|
| 5,675,372 A * | 10/1997 | Aguayo et al. ................. | 725/107 |
| 6,965,895 B2 | 11/2005 | Smith et al. | |
| 7,592,912 B2 | 9/2009 | Hasek et al. | |
| 7,688,754 B2 | 3/2010 | Williams | |
| 7,693,081 B1 | 4/2010 | Zriny et al. | |
| 7,729,917 B2 * | 6/2010 | Miyamoto et al. ............ | 704/270 |
| 7,826,383 B2 | 11/2010 | Savard et al. | |
| 8,149,330 B2 * | 4/2012 | Streijl ........................... | 348/468 |
| 8,281,231 B2 * | 10/2012 | Berry et al. .................... | 715/201 |
| 8,345,159 B2 * | 1/2013 | Polumbus et al. ............. | 348/468 |
| 8,352,994 B2 * | 1/2013 | Pham et al. .................... | 725/107 |
| 8,564,721 B1 * | 10/2013 | Berry et al. .................... | 348/515 |
| 2002/0055950 A1 * | 5/2002 | Witteman ................... | 707/500.1 |
| 2002/0154220 A1 * | 10/2002 | Dieterich ..................... | 348/184 |
| 2003/0061212 A1 | 3/2003 | Smith et al. | |
| 2003/0169366 A1 * | 9/2003 | Lenzi et al. ................... | 348/461 |
| 2007/0047542 A1 | 3/2007 | Thukral | |
| 2008/0040111 A1 * | 2/2008 | Miyamoto et al. ............ | 704/240 |
| 2008/0196077 A1 * | 8/2008 | Basse ............................ | 725/116 |
| 2008/0252780 A1 * | 10/2008 | Polumbus a/k/a Tad Polumbus et al. ............................. | 348/468 |
| 2008/0270134 A1 * | 10/2008 | Miyamoto et al. ............ | 704/251 |
| 2009/0064251 A1 | 3/2009 | Savoor et al. | |
| 2009/0100492 A1 | 4/2009 | Hicks, III et al. | |
| 2009/0106809 A1 | 4/2009 | Rahman | |
| 2009/0185074 A1 * | 7/2009 | Streijl ........................... | 348/468 |
| 2009/0257360 A1 * | 10/2009 | Patel et al. .................... | 370/252 |
| 2010/0150018 A1 | 6/2010 | Beattie, Jr. et al. | |
| 2010/0271488 A1 | 10/2010 | Garcia et al. | |
| 2010/0313230 A1 * | 12/2010 | Van Doorn et al. ........... | 725/107 |
| 2010/0322091 A1 * | 12/2010 | Savoor et al. ................. | 370/252 |
| 2011/0088070 A1 | 4/2011 | Pham et al. | |

(Continued)

*Primary Examiner* — James R Sheleheda
(74) *Attorney, Agent, or Firm* — Jackson Walker L.L.P.

(57) ABSTRACT

A method and system for monitoring video assets provided by a multimedia content distribution network includes testing closed captions provided in output video signals. A video and audio portion of a video signal are acquired during a time period that a closed caption occurs. A first text string is extracted from a text portion of a video image, while a second text string is extracted from speech content in the audio portion. A degree of matching between the strings is evaluated based on a threshold to determine when a caption error occurs. Various operations may be performed when the caption error occurs, including logging caption error data and sending notifications of the caption error.

20 Claims, 7 Drawing Sheets

(56) References Cited

U.S. PATENT DOCUMENTS

| | | |
|---|---|---|
| 2011/0090346 A1 | 4/2011 | Pham et al. |
| 2011/0102600 A1* | 5/2011 | Todd ............................. 348/180 |
| 2011/0134321 A1* | 6/2011 | Berry et al. ................... 348/464 |
| 2011/0271307 A1* | 11/2011 | Post et al. ....................... 725/70 |
| 2012/0050545 A1* | 3/2012 | Pham et al. ................... 348/192 |
| 2012/0050546 A1* | 3/2012 | Pham ............................ 348/192 |
| 2012/0278829 A1* | 11/2012 | Todd ............................... 725/19 |
| 2013/0124202 A1* | 5/2013 | Chang ........................... 704/235 |
| 2013/0162841 A1* | 6/2013 | Gustafsson et al. ........... 348/192 |

* cited by examiner

METHOD AND SYSTEM FOR TESTING CLOSED CAPTION CONTENT OF VIDEO ASSETS

FIELD OF THE DISCLOSURE

The present disclosure relates to baseband video monitoring, and in particular to test monitoring of baseband video assets.

BACKGROUND

Users of a multimedia content distribution network (MCDN) may be provided a wide range of video assets to select from. A service provider operating the MCDN may be faced with various quality control issues related to the video assets and the performance of MCDN equipment. Feedback about MCDN performance issues are typically obtained via information gleaned from user support requests and/or costly support visits to user locations.

DETAILED DESCRIPTION

Figure 1:
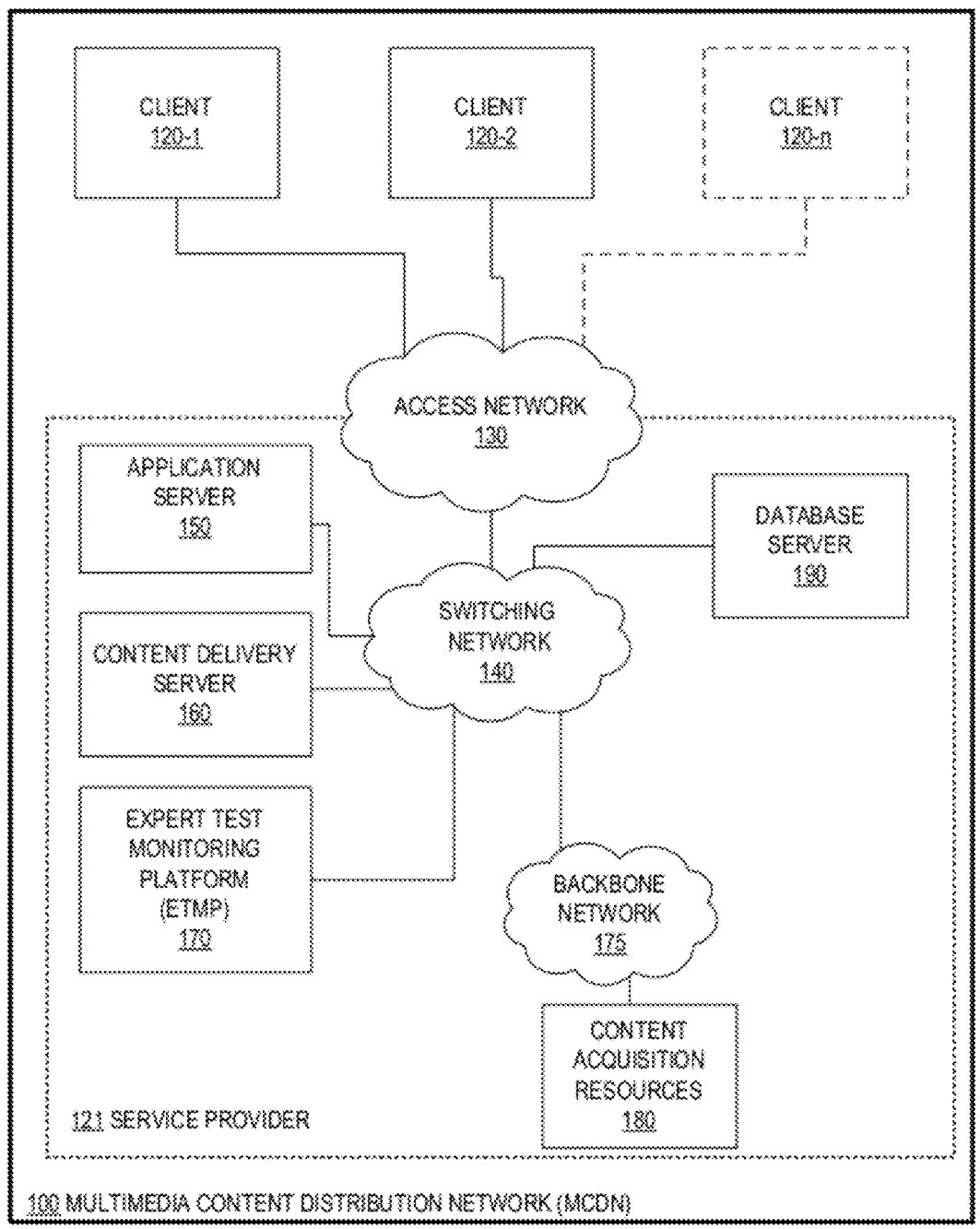
FIG. 1 is a block diagram of selected elements of an embodiment of an MCDN.

In one aspect, a disclosed method for monitoring an output channel of an MCDN includes acquiring a baseband video signal output by an MHD configured as a terminal device of the MCDN to generate a video image, and extracting a text string from a text portion of the video image. The method may further include receiving speech content generated by the MHD and corresponding to the selected baseband video signal, converting the speech content into another text string, and comparing the two text strings. The first text string and the speech content may occur in the baseband video signal during a shared period of time.

In certain embodiments, the method operation of comparing may further include determining a degree of matching between the first text string and the second text string. When the degree of matching falls below a predetermined threshold, the method may include generating a caption error. The method may further include logging a portion of the baseband video signal and the speech content corresponding to the caption error. The method may still further include sending an electronic notification of the caption error.

In another aspect, a disclosed computerized test system for monitoring output from an MCDN includes a processor coupled to first memory media and a frame acquirer accessible to the processor and configured to acquire audio and video signals. The memory media may include executable instructions to acquire a baseband video signal output by an MHD configured as an MCDN client to generate a video image, and extract a first text string from a closed caption in the video image. The executable instructions may further be executable to receive an audio track generated by the MHD and corresponding to the acquired baseband video signal, identify a period of time when the first text string appears in the video image, and extract a second text string from a portion of the audio track corresponding to the period of time.

In particular embodiments, the MHD maybe configured as a unit-under-test (UUT) within an ETMP of the MCDN, while the memory media may further include executable instructions to request access to the UUT from an ETMP master controller. In response to receiving access to the UUT, the executable instructions may further include instructors to send a first network command to power on the UUT via a network-based power controller, send a second network command to select an output channel of the UUT via a network-based remote control, and send a third network command to route the output channel of the UUT to the frame acquirer.

In certain embodiments, the memory media may further include executable instructions to determine a degree of matching between the first text string and the second text string. When the degree of matching falls below a predetermined threshold, the executable instructions may further include instructions to generate a caption error. The instructions may further include instructions to log the caption error along with a timestamp, and log a portion of the baseband video signal and the audio track corresponding to the caption error. The threshold may be determined at least in part based on a number of matching words. The threshold may further be determined at least in part based on an accuracy associated with extracting the second text string from speech content in the portion of the audio track. The instructions may further include executable instructions to send a notification of the caption error to a registered entity.

In yet another aspect, disclosed computer readable memory media for monitoring output from an MCDN may include executable instructions to acquire a baseband video signal output by an MHD configured to output MCDN channels, such that a video image is generated. The instructions may also extract a first text string from a closed caption in the video image, receive an audio track generated by the MHD and corresponding to the acquired baseband video signal, and identify a period of time when the first text string appears in the video image. The instructions may still further extract a second text string from a portion of the audio track corresponding to the period of time, and determine a degree of matching between the first text string and the second text string.

In particular embodiments, the MHD may be configured as a UUT within an ETMP of the MCDN, while the memory media further include executable instructions to request access to the UUT from an ETMP master controller. In response to receiving access to the UUT, the instructions may send a first network command to power on the UUT via a network-based power controller, send a second network command to select an output MCDN channel of the UUT via a network-based remote control, and send a third network command to route the output channel of the UUT.

In given embodiments, the memory media further include executable instructions to generate a caption error when the degree of matching falls below a predetermined threshold, log the caption error along with a timestamp, and send a notification of the caption error. The instructions may also log a portion of the baseband video signal and the audio track corresponding to the caption error. When the degree of matching is greater than the threshold, the instructions may certify that the closed caption is accurately presented at the MHD. The threshold may be determined at least in part based on a number of matching words.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram illustrating selected elements of an embodiment of MCDN 100, including ETMP 170, which may be used for monitoring an output channel from MCDN 100 to validate closed captioning of video assets, as will be described in detail herein. Although multimedia content is not limited to television (TV), video-on-demand (VOD), or pay-per-view (PPV) programs, the depicted embodiments of MCDN 100 and its capabilities are primarily described herein with reference to these types of multimedia content, which are interchangeably referred to herein as "multimedia content", "multimedia content programs", "multimedia programs" or, simply, "programs."

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 175, as well as application server 150, database server 190, and content delivery server 160, also shown connected to switching network 140.

Access network 130 demarcates clients 120 and service provider 121, and provides at least one connection path between clients 120 and service provider 121. In some embodiments, access network 130 is an Internet protocol (IP) compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twisted pair cables, fiber optic cables, or a combination thereof. MCDN 100 may include digital connections between clients 120 and a node (see also FIG. 4) in access network 130 while fiber, cable or another broadband medium connects service provider resources to the node. In other embodiments, the broadband cable may extend all the way to clients 120. In certain embodiments, fiber optic cables may be provided from the node in access network 130 to each individual client 120. The connections between access network 130 and clients 120 may include digital subscriber line (DSL) connections. In particular embodiments, the connections may be DSL-compliant twisted pair or another type of galvanic loop (see also FIG. 4).

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL-compliant connections, switching network 140 and/or access network 130 may include elements of a DSL access multiplexer (DSLAM) that multiplexes many subscriber DSLs to backbone network 175 (see also FIG. 4).

Backbone network 175 represents a private network including, as an example, a fiber based network to accommodate high data transfer rates. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using an electronic programming guide (EPG), such as EPG 316 described below with respect to FIG. 3. Accordingly, a user of MCDN 100 may be able to browse scheduled programming well in advance of the broadcast date and time. Some scheduled programs may be "regularly" scheduled programs, which recur at regular intervals or at the same periodic date and time (i.e., daily, weekly, monthly, etc.). Programs which are broadcast at short notice or interrupt scheduled programs are referred to herein as "unscheduled programming."

Acquired content is provided to content delivery server 160 via backbone network 175 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. Application server 150 may host or otherwise implement one or more applications for MCDN 100. Application server 150 may be any data processing system with associated software that provides applications for clients or users. Application server 150 may provide services including multimedia content services, e.g., EPGs, digital video recording (DVR) services, VOD programs, PPV programs, IPTV portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include various applications (not shown in FIG. 1) that may provide functionality to clients 120.

Also depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 may also store device information, such as identifiers for client 120, model identifiers for remote control devices, identifiers for peripheral devices, etc.

Also shown in FIG. 1 is ETMP 170, which represents a facility for test monitoring of output channels of MCDN 100. ETMP 170 may include infrastructure for emulating functionality associated with clients 120 for the purpose of capturing and analyzing output video and/or audio signals in order to test the performance and quality of video assets provided by MCDN 100 (see also FIG. 2).

It is noted that clients 120 may include network appliances collectively referred to herein as customer premises equipment (CPE). In various embodiments, CPE may include the following devices: a gateway (GW), an MHD (see also FIG. 3), and a display device (not shown in FIG. 1). Any combination of the GW, the MHD, and the display device may be integrated into a single physical device. Thus, for example, CPE might include a single physical device that integrates the GW, MHD, and a display device. As another example, an MHD may be integrated into a display device, while the GW may be housed within a physically separate device.

The GW may provide connectivity for client 120 to access network 130. The GW may provide an interface and conversion function between access network 130 and a client-side local area network (LAN). The GW may include elements of a conventional DSL or cable modem. In some embodiments, the GW may further include routing functionality for routing multimedia content, conventional data content, or a combination of both in compliance with IP or another network layer protocol. In some embodiments, the LAN may encompass or represent an IEEE 802.3 (Ethernet) LAN, an IEEE 802.11-type (WiFi) LAN, or a combination thereof. The GW may still further include WiFi or another type of wireless access point to extend the LAN to wireless-capable devices in proximity to the GW. The GW may also provide a firewall (not depicted) between clients 120 and access network 130.

Clients 120 may further include a display device or, more simply, a display (not shown in FIG. 1). The display may be implemented as a TV, a liquid crystal display screen, a computer monitor, or the like. The display may comply with a display standard for computer monitors and/or TV displays. Standards for computer monitors include analog standards such as video graphics array (VGA), extended graphics array (XGA), etc., or digital standards such as digital visual interface (DVI) and high definition multimedia interface (HDMI), among others. A TV display may comply with standards such as National Television System Committee (NTSC), Phase Alternating Line (PAL), or another suitable standard. The display may include one or more integrated speakers to play audio content.

Clients 120 may further include respective remote control (not shown in FIG. 1), which is configured to control the operation of MHD by means of a user interface, such as EPG 316 (see FIG. 3) that may be displayed by the display. The remote control of client 120 may be operable to communicate requests or commands wirelessly to the MHD using infrared (IR) or radio frequency (RF) signals. MHDs may also receive requests or commands via buttons located on side panels of MHDs.

The MHD may be enabled and configured to process incoming multimedia signals to produce audio and visual signals suitable for delivery to the display and any optional external speakers. Incoming multimedia signals received by the MHD may be compressed and/or encrypted, digital or analog, packetized for delivery over packet-switched embodiments of access network 130 or modulated for delivery over cable-based access networks. In some embodiments, the MHD may be implemented as a stand-alone set top box suitable for use in a co-axial or IP-based MCDN.

Figure 2:
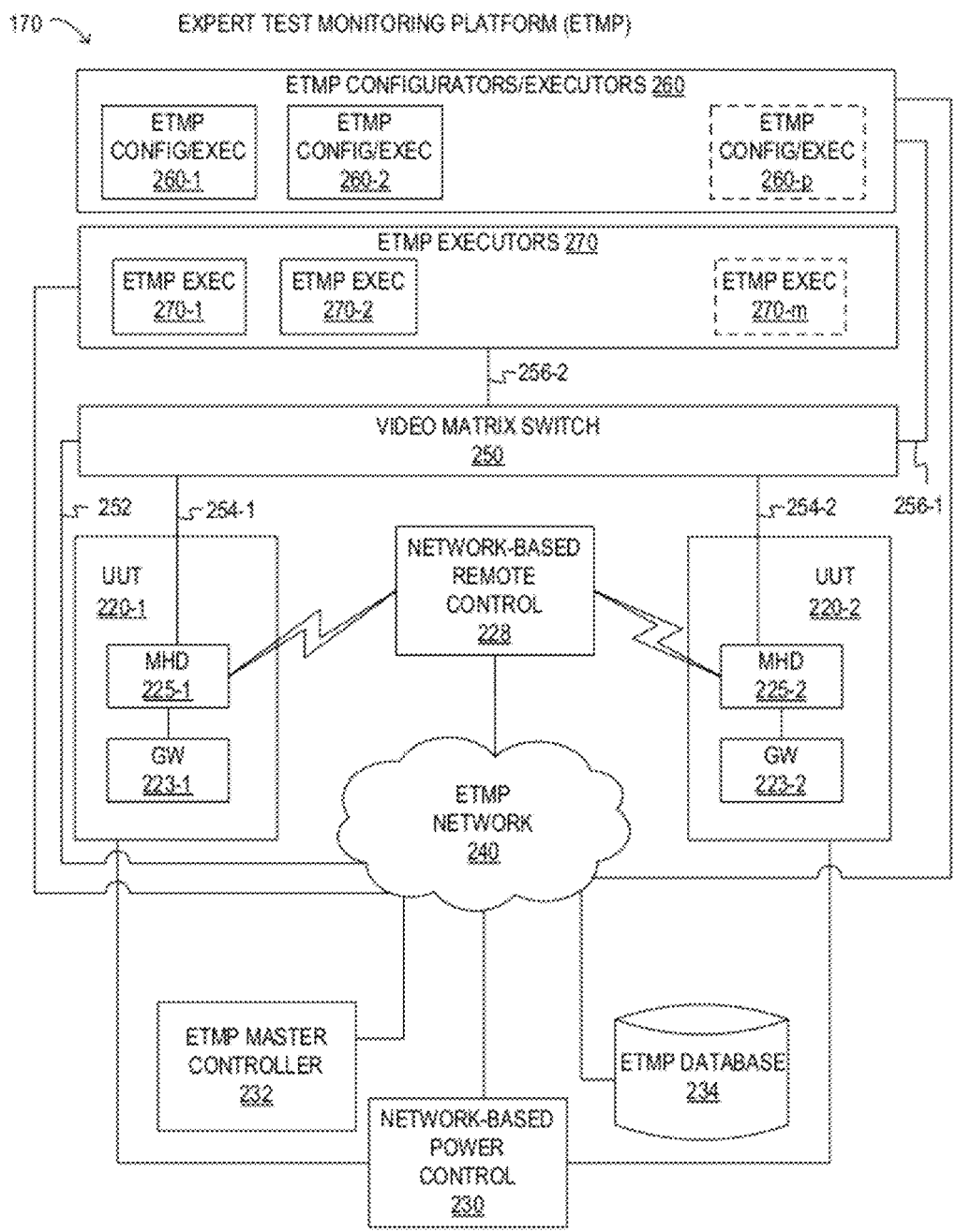
FIG. 2 is a block diagram of selected elements of an embodiment of an expert test monitoring platform (ETMP)

Referring now to FIG. 2, a block diagram illustrating selected elements of an embodiment of ETMP 170 is presented. The embodiment depicted in FIG. 2 is an exemplary implementation of ETMP 170 for illustrative purposes. Elements in ETMP 170, such as, ETMP configurators/executors 260, may be used to monitor MCDN channels and to validate closed captioned content provided by MCDN 100, as described in detail herein. It will be understood that, in different embodiments, elements depicted in FIG. 2 may be modified, rearranged, or omitted. For example, in certain embodiments, ETMP network 240 may refer to portions of a larger, external network system (not shown in FIG. 2). In various embodiments, video matrix switch 250 may represent either an automatic switch or a manual switch or a combination thereof. Other substitutions may be implemented in given embodiments of ETMP 170, as desired.

In FIG. 2, ETMP network 240 is shown providing communication links between various elements in ETMP 170, as will now be described in detail. It is noted that ETMP network 240 may also link ETMP 170 to switching network 140 (not shown in FIG. 2, see FIG. 1). Also shown in FIG. 2 are UUTs 220, which may represent similar elements as CPE associated with clients 120, as described previously. In FIG. 1, UUT 220-1 and 220-2 are shown as two exemplary instances for clarity, while it will be understood that ETMP 170 may include different numbers of UUT 220 in various embodiments. UUT 220 may represent an embodiment of client 120 that is implemented in ETMP 170 for the purposes of testing and analyzing output channels of MCDN 100. Accordingly, UUT 220 may provide similar functionality as client 120, but may omit certain elements that are not relevant for testing purposes (see also FIG. 3). For example, UUT 220 may not include a display. In FIG. 2, UUT 220-1 may include MHD 225-1 and GW 223-1, as described previously (see also FIG. 3), while UUT 220-2 may include MHD 225-2 and GW 223-2.

As depicted in FIG. 2, network-based remote control 228 may represent a means to generate remote control signals for reception by MHD 225. Network-based remote control 228 may be configured to receive network commands that are addressed to a specific remote control port (not shown in FIG. 2) associated with a particular MHD 225, such as MHD 225-1. In this manner, network-based remote control 228 may provide functionality to emulate a remote control operated by a user of client 120 (see FIG. 1). Network commands sent to network-based remote control 228 may originate from a test operator of ETMP 170 or from an ETMP test program that is configured to execute in an automated manner.

Also shown in FIG. 2, network-based power control 230 may represent a means to control (i.e., switch) power to UUT 220, including to MHD 225, GW 223, and/or other elements. Network-based power control 230 may be configured to receive network commands that are addressed to a specific power circuit associated with a particular UUT 220. In this manner, network-based power control 230 may provide programmable switching capability to power down and power up UUT 220 and associated elements. Network commands sent to network-based power control 230 may originate from a test operator of ETMP 170 or from an ETMP test program, as will be described in detail below.

On the operational side of ETMP 170 in FIG. 2, are ETMP configurators/executors 260 and ETMP executors 270. A "configurator" refers to a module that allows an operator (not shown in FIG. 2) to perform individual test operations, generate test sequences, obtain test results, and otherwise manually operate a test facility. An ETMP configurator is therefore specific to ETMP 170. An "executor" refers to a module that is configured to execute previously stored test sequences, also referred to as test programs, jobs, batch files, scripts, etc., comprised of individual test operations or test instructions. An ETMP executor is also specific to ETMP 170. ETMP configurators/executors 260 include configurator modules that are executable on a computing device coupled to ETMP 170, and may also include executor functionality. ETMP executors 270 represent executor modules that do not include configurator functionality. ETMP 170 may include ETMP configurators/executors 260-1, 260-2 and so on, up to an arbitrary p-number of ETMP configurators/executors 260-p. ETMP 170 may include ETMP executors 270-1, 270-2 and so on, up to an arbitrary m-number of ETMP executors 270-m.

Additionally, in FIG. 2, video matrix switch 250 is shown providing connectivity between MHDs 225 and ETMP configurators/executors 260/ETMP executors 270. Video matrix switch 250 may receive network commands via link 252 to ETMP network 240. Video matrix switch 250 may couple to output baseband video signals from MHD 225 via links 254. Specifically, video matrix switch 250 may receive an output signal from MHD 225-1 via link 254-1 and from MHD 225-2 via link 254-2. Furthermore, video matrix switch 250 may be coupled to inputs of ETMP configurators/executors 260 via link 256-1 and to inputs of ETMP executors via link 256-2. It is noted that links 256 may represent multiple connections that form one edge of a switching matrix, while links 254 represent another edge of the switching matrix.

Also shown in FIG. 2 is ETMP master controller 232, which represents a functional module configured to manage access to resources of ETMP 170. ETMP master controller 232 may be configured to receive control requests for access to ETMP resources (such as UUTs 220 and associated elements in ETMP 170) from ETMP configurators or executors. For example, ETMP executor 270-1 may send a control request for access to UUT 220-2 from ETMP master controller 232, which may then grant the control request and assign control to ETMP executor 270-1. Subsequent requests for access to UUT 220-2 may then be denied by ETMP master controller 232, so long as ETMP executor 270-1 is assigned control of UUT 220-2. In certain embodiments, ETMP master controller 232 may take a priority of an ETMP test program into consideration when granting control requests to access ETMP resources and may terminate a currently assigned control relationship in favor of a higher priority one. In one embodiment, a scheduled ETMP test program may be assigned to ETMP executor 270-2 when a scheduled start time approaches the current time. The scheduled ETMP test program may be designated for UUT 220-2, which may be assigned for control by ETMP configurator/executor 260-1. In such an instance, ETMP master controller 232 may be configured to reassign control of UUT 220-2 to ETMP executor 270-2 and terminate the assignment of ETMP configurator/executor 260-1. A user of ETMP configurator/executor 260-1 may be given a warning by ETMP master controller 232 that a scheduled test is about to begin on UUT 220-2 and that a presently active test session will soon be terminated.

Finally, in FIG. 2, ETMP database 234 may represent a repository for data and information associated with ETMP 170. For example, ETMP database 234 may store configuration information representing ETMP resources, including network addresses and connection information for UUTs 220, video matrix switch 250, ETMP configurators/executors 260, ETMP executors 270, network-based remote control 228 and network-based power control 230. In various embodiments, ETMP master controller 232 may query ETMP database 234 for such information when managing control requests for ETMP resources. ETMP database 234 may further store ETMP test programs, as well as results of executed ETMP test programs and test operations. It is noted that various other elements in ETMP 170 may be configured to access ETMP database 234, as desired.

Figure 7:
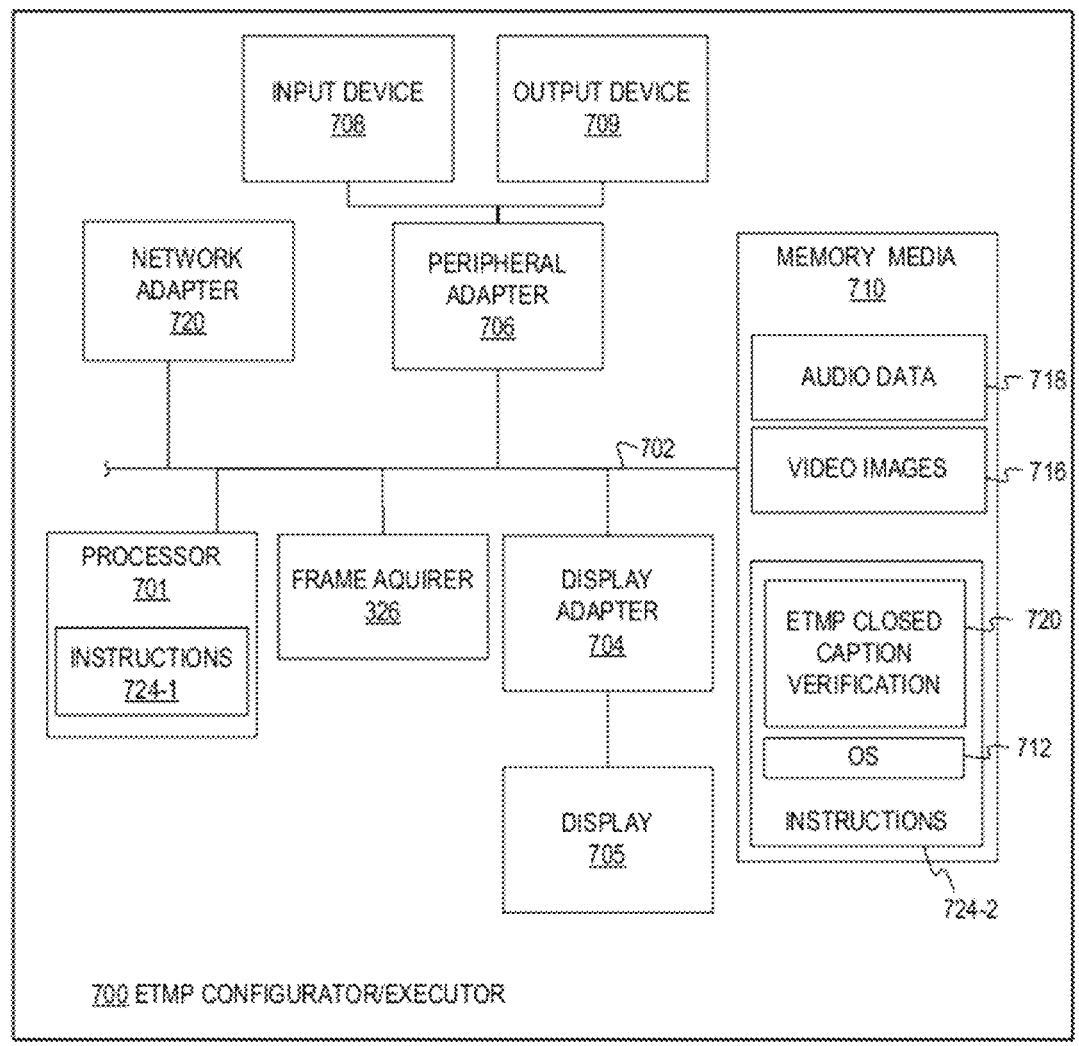
FIG. 7 is a block diagram of selected elements of an embodiment of an ETMP configurator/executor.

In operation of ETMP 170, a user may access ETMP configurator/executor 260-1 to perform closed caption test operations on UUT 220-1 (see also ETMP closed caption verification 720 in FIG. 7). The user may first send a control request to ETMP master controller 232 for access to UUT 220-1. After the control request has been approved and access to UUT 220-1 has been assigned to ETMP configurator/executor 260-1, ETMP configurator/executor 260-1 may query ETMP database 234 for network addresses and configuration information associated with UUT 220-1. Using a queried network address, the user may send a network command using ETMP configurator/executor 260-1 to network-based power control 230 to power up UUT 220-1. ETMP configurator/executor 260-1 may also be used to send a network command to network-based remote control 228 to select a particular video channel for output by UUT 220-1 (i.e., MHD 225-1). ETMP configurator/executor 260-1 may also be used to send a network command to video matrix switch 250 via switch link 254-1 (an output from MHD 225-1) to an input of ETMP configurator/executor 260-1 via link 256-1. The input to ETMP configurator/executor 260-1 may be at frame acquirer 326 (i.e., frame grabber) (see FIGS. 3 and 7), which may be configured to acquire a video and/or audio portion of the selected video channel that has been routed via video matrix switch 250. The acquired audio/video may be used to perform a closed caption test operation, which may generate a test result, as will be described in detail below. The user may also activate recording of test operations performed using ETMP configurator/executor 260-1. The recorded test operations may be stored in ETMP database 234 as an ETMP test program, that may be retrieved at a later time and executed using ETMP executor 270.

Closed captioning may be provided by MCDN 100 as an optional feature, for example, as a service to hearing-impaired users watching MCDN programs. Closed captioning of MCDN programs may be provided as a network service, for example, by a closed captioning application (not shown in the figures) executing on application server 150 (see FIG. 1). Ideally, the closed caption text displayed to a user at client 120 accurately reproduces speech content and other audio content on the audio track and is synchronized in time with the audio track. In reality, the accuracy and synchronization of closed caption text may vary during transmission over MCDN 100. A certain amount of variance, in accuracy and/or in synchronization, of the closed caption text may be acceptable. For example, the closed caption variance may be within a range representing a normal operating condition of MCDN 100. When the closed caption variance is excessive, a closed caption error may be detected, and may indicate a problem with the closed captioning application, or another portion of MCDN 100. In an effort to monitor MCDN performance and perform quality control of video assets, service provider 121 (see FIG. 1) may employ ETMP 170 to perform testing of closed caption output provided by MCDN 100.

In given embodiments, a closed caption test operation may involve a test of a particular region of the video output, in which a closed caption text corresponding to speech content in an audio track is presented. Specifically, at a time when a given closed caption text appears on the selected video channel at UUT 220, a portion of the audio track being output with the video channel may be acquired, along with a video image, using frame acquirer 326, as discussed above. In certain instances, the video output may be monitored for the presence of a closed caption text, or for a change in the closed caption text being prevented, to determine the time period. The acquired audio and video image portions may be acquired using a buffered acquisition, for example, with a pretrigger function to retain a certain portion prior to and immediately after the appearance of the closed caption text, or a desired time period associated with the closed caption text. In certain embodiments, the appearance of the closed caption text (and/or the time period) may be tracked in terms of individual video frames which include the same closed caption text.

A first text string may then be extracted from the video image portion, corresponding to the closed caption text actually displayed on the video output at UUT 220. A second text string may be extracted from the audio track actually output at UUT 220. The extraction of the second text string may be controlled by a common time period, as defined by when and how long the closed caption text is displayed. In certain embodiments, the extraction of the second text string may further be controlled by a presence and/or absence of audio content during the common time period that the closed caption text is displayed. In one example, a certain audio portion prior to, during, and after the closed caption display period is acquired and analyzed to determine speech content. The extraction of the second text string may be performed by converting speech content in the audio track into the second text string, which may be an operation associated with a certain accuracy (i.e., error rate). The first text string may then be compared to the second text string to determine a degree of matching as a result. The degree of matching may be based on a text metric, such as a number of matching words, or a number of matching text characters. The degree of matching may be a value within a range of observed values.

In order to determine an acceptable degree of matching for the closed caption test, a predetermined threshold (i.e., a minimum acceptable value) may be applied to the degree of matching. It is noted that the threshold may also be determined by (or related to) the text metric discussed above. For example, the threshold may be based on the number of matching words, or on a relative fraction of matching words. The threshold may be based, at least in part, on the accuracy of the speech-to-text conversion performed to extract the second text string, which may define a limiting operational constraint for the closed caption test. In other embodiments, the threshold may be based on operational or comparative values obtained from various network systems. When the degree of matching is above the threshold, the closed caption output at UUT 220 may be certified as being acceptable (e.g., correctly presented by MCDN 100). When the degree of matching is below the threshold, a caption error may be generated, indicating that UUT 220 did not output the closed caption in an acceptable manner. Generating the caption error may further involve a number of additional operations. The caption error may be logged with a timestamp and an indication of the selected video channel. A portion of the video output, the video image, and/or the audio track may also be logged. A caption error message may also be sent to a predetermined network address. For example, a test operator may receive an email from the closed caption test each time a caption error is detected, while the email may provide detailed information about the caption error and/or a link to the logged caption error data. In some embodiments, caption error data may be logged using ETMP database 234, which may then provide subsequent access to the caption error data for further analysis, such as determining a cause for a caption error, statistical analyses of caption errors, etc.

As described above, ETMP 170 may be used to perform closed caption testing on video assets provided by MCDN 100. In this regard, ETMP 170 provides an ability to automatically monitor and test a large number of video assets, such as MCDN programs, that may deliver closed captioned multimedia content. ETMP 170 further provides automatic logging of closed caption test results, including the capability to provide notifications of detected caption errors to desired entities.

Figure 3:
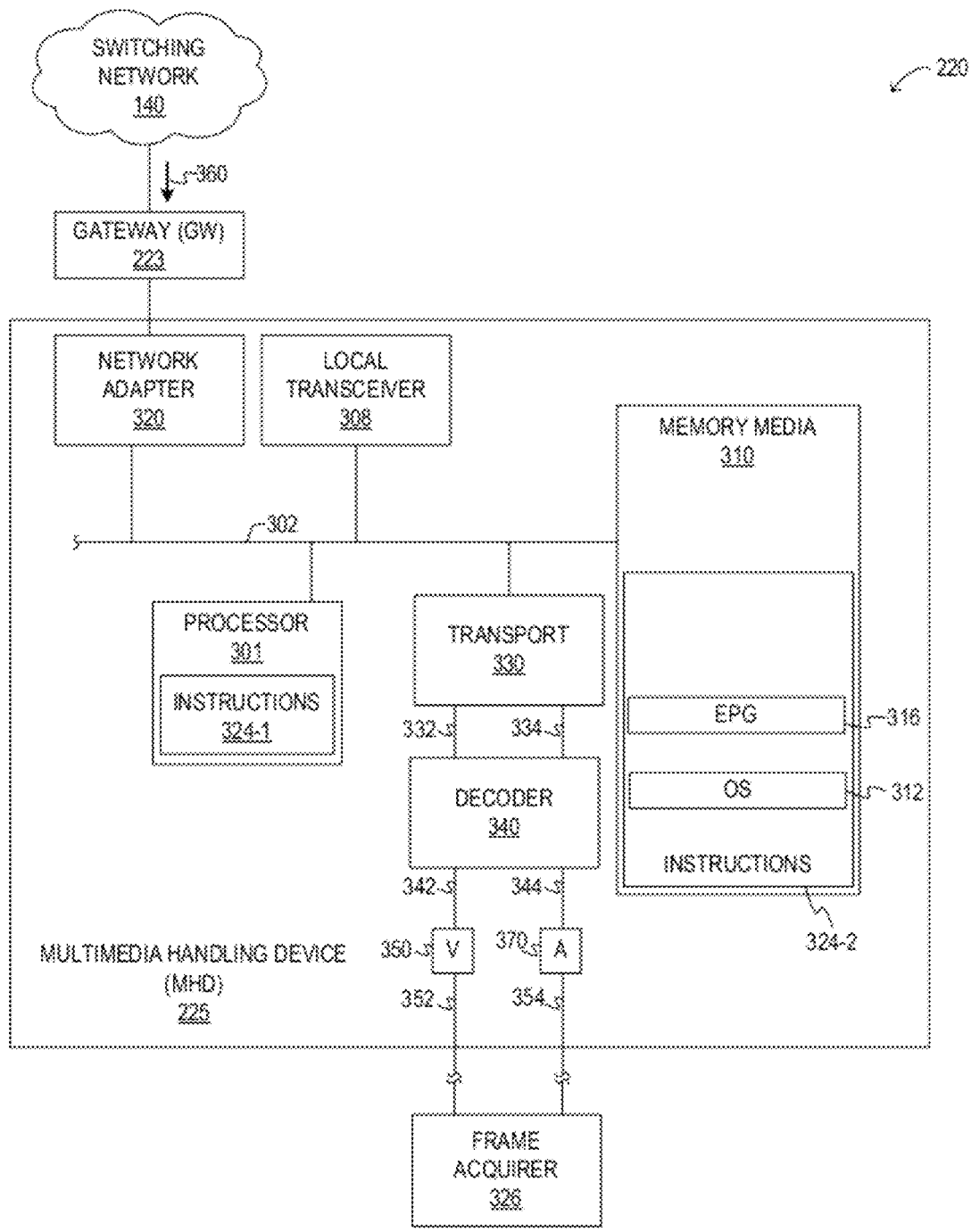
FIG. 3 is a block diagram of selected elements of an embodiment of a multimedia handling device (MHD)

Referring now to FIG. 3, a block diagram illustrating selected elements of an embodiment of UUT 220, including further details of MHD 225, is presented. In FIG. 3, MHD 225 is shown as a functional component of UUT 220 along with GW 223, which is shown receiving multimedia content 360 from switching network 140. It is noted that UUT 220 may represent functionality similar to that provided to clients 120 and, in particular, may receive substantially the same multimedia content 360, as received by clients 120 (see FIG. 1). In this manner, UUT 220 may serve as a realistic and accurate representation of clients 120 within ETMP 170 for closed caption testing purposes using frame acquirer 326, as described herein.

In the embodiment depicted in FIG. 3, MHD 225 includes processor 301 coupled via shared bus 302 to storage media, collectively identified as memory media 310. MHD 225, as depicted in FIG. 3, further includes network adapter 320 that interfaces MHD 225 to switching network 140 via GW 223 and through which MHD 225 receives multimedia content 360. GW 223 is shown providing a bridge to switching network 140, and receiving multimedia content 360 from switching network 140.

In embodiments suitable for use in IP-based content delivery networks, MHD 225, as depicted in FIG. 3, may include transport unit 330 that assembles the payloads from a sequence or set of network packets into a stream of multimedia content. In coaxial-based access networks, content may be delivered as a stream that is not packet-based and it may not be necessary in these embodiments to include transport unit 330. In a co-axial implementation, however, other tuning resources (not explicitly depicted in FIG. 3) may be used to "filter" desired content from other content that is delivered over the coaxial medium simultaneously and these tuners may be provided in MHD 225. The stream of multimedia content received by transport unit 330 may include audio information and video information and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 370 respectively to produce video and audio signals 352 and 354 in a format compliant with a display, as mentioned previously. Since MHD 225 is configured for test monitoring within ETMP 170, a display may be omitted from UUT 220. Video and audio signals 352 and 354, which may be referred in aggregate to as the "baseband video signal," may represent analog signals, digital signals, or a combination thereof, in different embodiments. In FIG. 3, video and audio signals 352 and 354 are shown being ultimately routed to frame acquirer 326 (see also FIG. 7), which may be associated with ETMP configurators/executors 260 and/or ETMP executor 270. The routing of video and audio signals 352 and 354 may be accomplished using video matrix switch 250 (see FIG. 2), as described above.

Memory media 310 encompasses persistent and volatile media, fixed and removable media, and magnetic and semiconductor media. Memory media 310 is operable to store instructions, data, or both. Memory media 310 as shown may include sets or sequences of instructions 324-2 and/or data, namely, an operating system 312 and EPG 316. Operating system 312 may be a UNIX or UNIX-like operating system, a Windows® family operating system, or another suitable operating system. In some embodiments, memory media 310 is configured to store and execute instructions provided as services to UUT 220 by application server 150, as mentioned previously. Instructions 324 may also reside, completely or at least partially, within processor 301 during execution thereof. It is further noted that processor 301 may be configured to receive instructions 324-1 from instructions 324-2 via shared bus 302. EPG 316 represents a guide to the multimedia content provided to UUT 220 via MCDN 100, and may be output as an element of the user interface. The user interface may include a plurality of menu items arranged according to one or more menu layouts, which enable operation of MHD 225 using a remote control.

Local transceiver 308 represents an interface of MHD 225 for communicating with external devices, such as a remote control or network-based remote control 228 (see FIG. 2). Local transceiver 308 may provide a mechanical interface for coupling to an external device, such as a plug, socket, or other proximal adapter. In some cases, local transceiver 308 is a wireless transceiver, configured to send and receive IR or RF or other signals. In some implementations local transceiver 308 receives IR or RF signals, but does not transmit IR or RF signals, i.e., local transceiver 308 may be a receiver. Local transceiver 308 may be accessed by a remote control module (not shown in FIG. 3) for providing remote control functionality. In some embodiments, local transceiver 308 may include WiFi functionality.

Figure 4:
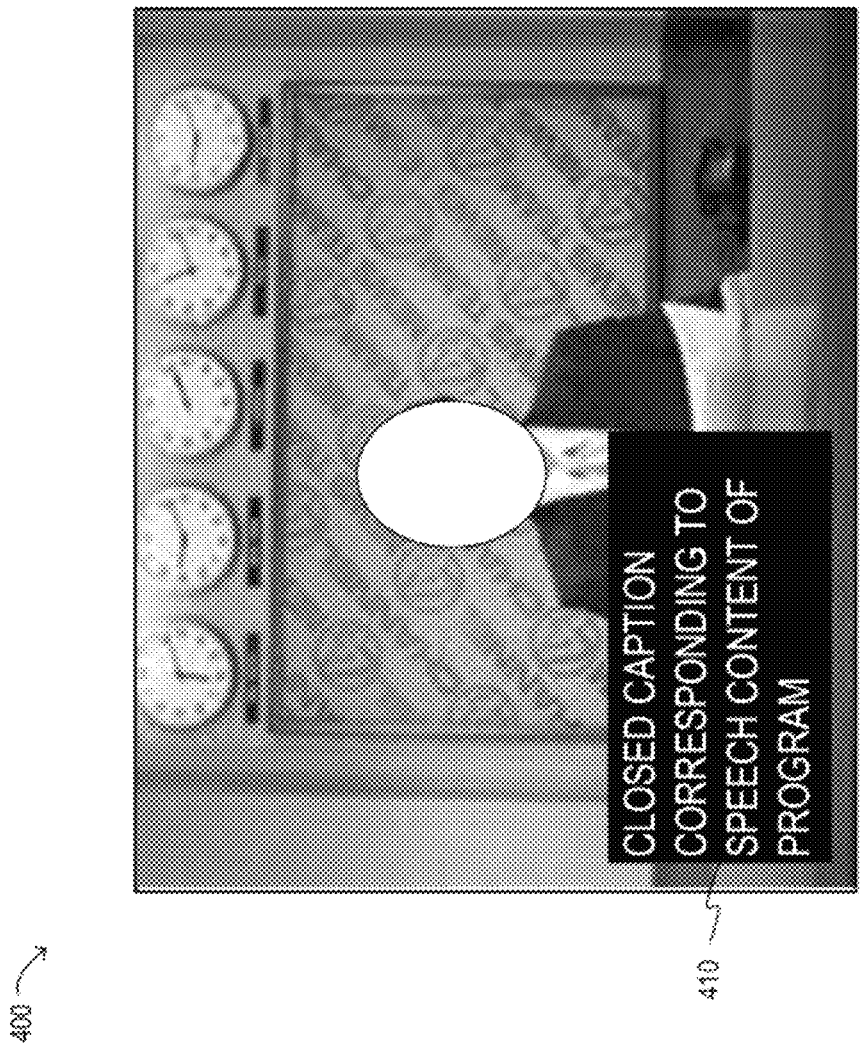
FIG. 4 is a block diagram of selected elements of an embodiment of a video asset.

Turning now to FIG. 4, a block diagram of selected elements of an embodiment of output video channel 400, representing a video asset associated with MCDN 100, is depicted. Output video channel 400 may be generated by MHD 225 in response to a receiving a channel selection command, for example, via local transceiver 308 (see FIG. 3). Output video channel 400 may include a closed caption 410, which may correspond to speech content occurring in an audio track of output video channel 400. In certain embodiments, closed caption 410 may not be synchronized with other elements in output video channel 400, which may be determined by closed caption testing and validation, as described herein. Other video and image elements may be implemented in various embodiments of output video channel 400.

Figure 5:
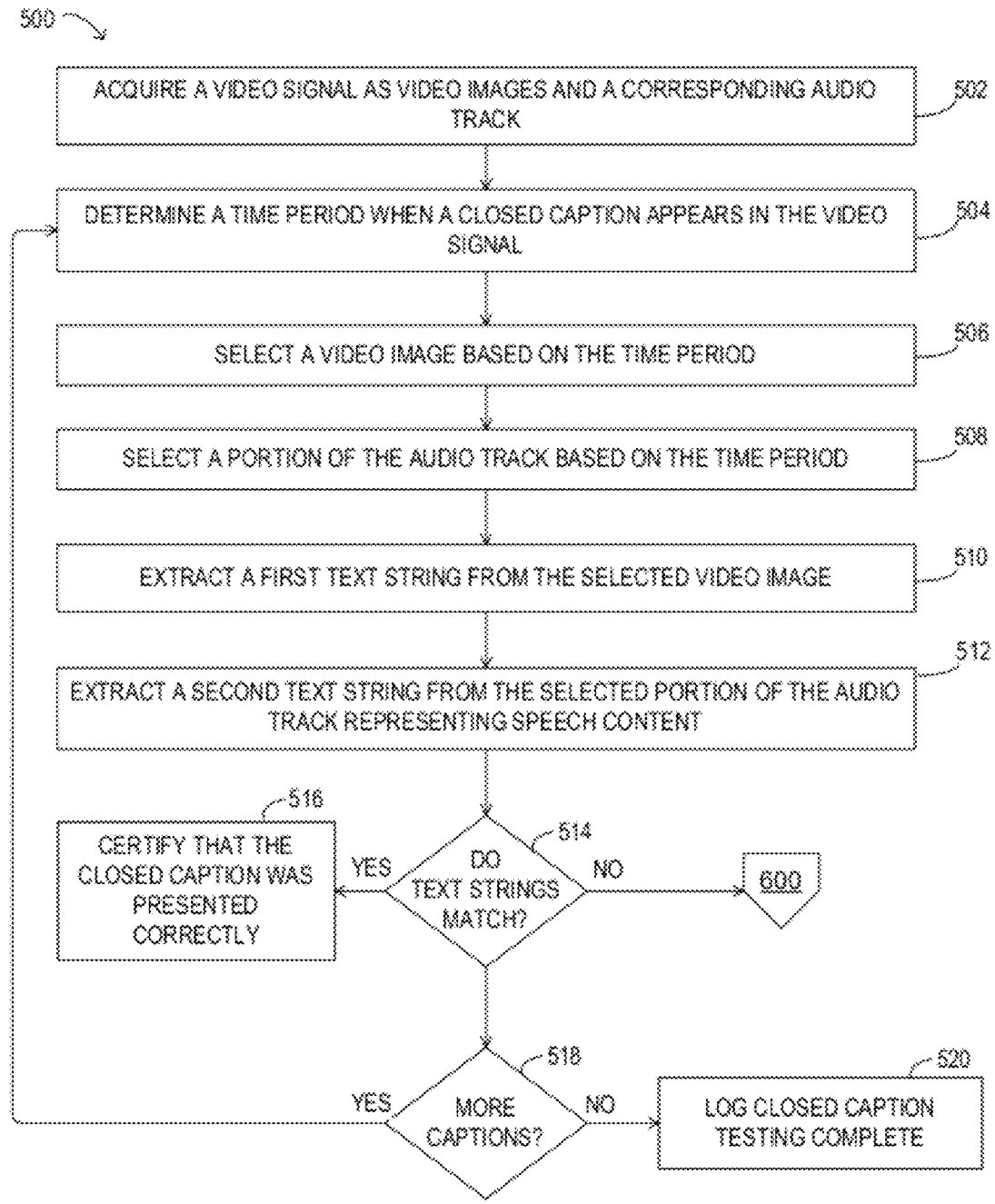
FIG. 5 illustrates selected elements of an embodiment of a closed caption testing method.

Turning now to FIG. 5, selected elements of an embodiment of a method 500 for monitoring of MCDN output channels is illustrated in flow chart form. In one embodiment, method 500 may be performed by ETMP 170 (see FIGS. 1, 2) to perform closed caption testing and validation, as described herein. In certain embodiments, ETMP configurators/executors 260 (see FIGS. 2, 7) may be configured to execute at least certain portions of method 500. It is noted that certain operations described in method 500 may be optional or may be rearranged in different embodiments.

In method 500, a video signal is acquired (operation 502) as video images and a corresponding audio track. The video signal may be a digital signal or an analog signal. The video images may be acquired as a series of still images. The video signal may correspond to a selected MCDN program output by an MHD. The MCDN may provide a closed caption for the MCDN program. A time period when a closed caption appears in the video signal may be determined (operation 504). The time period may be determined by analyzing the video images, the audio track, or a combination thereof, as discussed above with respect to FIG. 2. A video image may be selected (operation 506) based on the time period. A selected video image within the time period may display the closed caption. A portion of the audio track may be selected (operation 508) based on the time period. The portion of the audio track may include speech content corresponding to the closed caption. The portion of the audio track may be selected solely based on the time period when an expected audio content, such as speech content, corresponding to the closed caption is supposed to occur in the video signal. A first text string may be extracted (operation 510) from the selected video image. The first text string may be extracted using an image processing algorithm to detect alphanumeric text in the video signal. The image processing algorithm may further be configured to detect an expected text portion in the selected video image, such as a closed caption. Then, a second text string may be extracted (operation 512) from the selected portion of the audio track representing speech content. The second text string may be extracted using a speech-to-text algorithm.

Next in method 500, a determination may be made (operation 514) whether the first and second text strings match. The determination in operation 514 may be made based on a threshold value for a degree of matching between the first text string and the second text string, as described previously. When the result in operation 514 is YES, then method 500 may certify (operation 516) that the closed caption was presented correctly. When the result in operation 514 result is NO, method 500 may proceed to method 600 for performing operations when a caption error is detected (see FIG. 6). Then in method 500, a further determination may be made (operation 514). The fail tasks and the pass tasks may be defined in advance and associated with the check point condition in operation 514. Then, the check point result may be logged (operation 518) whether more captions are to be detected. When the result of operation 518 is YES, then method 500 may loop back to operation 504, from where a subsequent closed caption may be tested. When the result of operation 518 is NO, then completion of closed caption testing may be logged (operation 520).

Figure 6:
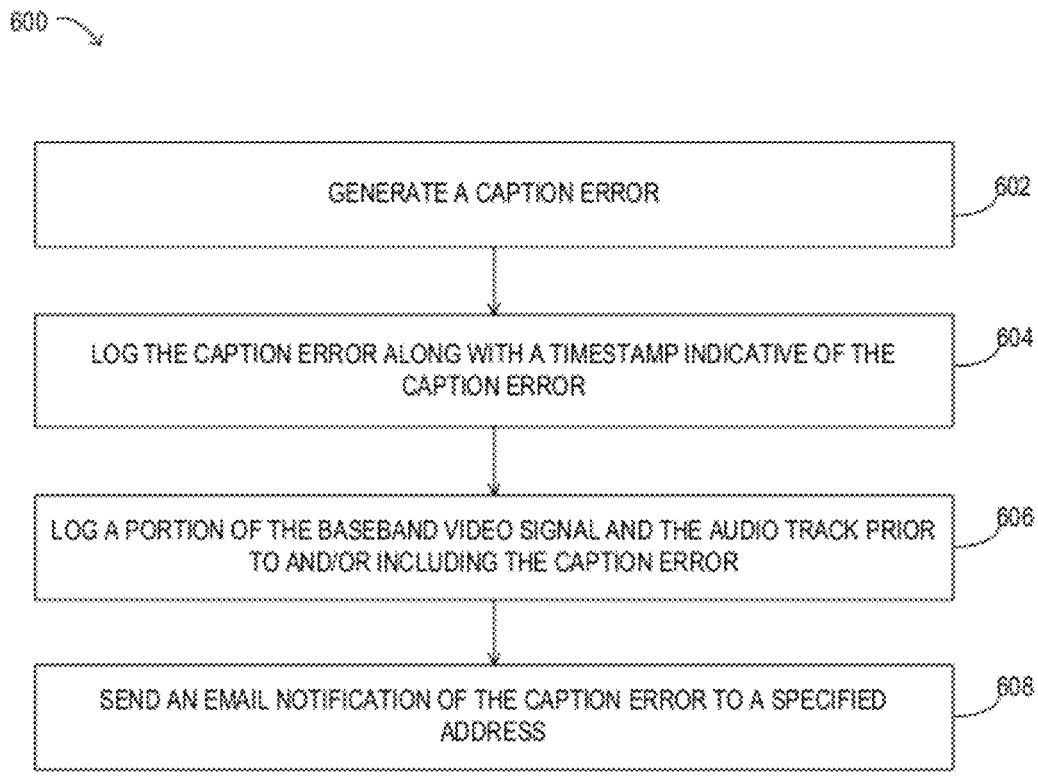
FIG. 6 illustrates selected elements of another embodiment of a closed caption testing method.

Turning now to FIG. 6, selected elements of an embodiment of method 600 for closed caption testing are illustrated in flow chart form. In one embodiment, method 600 may be performed by ETMP configurators/executors 260 (see FIGS. 2 and 7) in conjunction with ETMP 170 (see FIGS. 1 and 2). It is noted that certain operations described in method 600 may be optional or may be rearranged in different embodiments. As noted above, method 600 may represent operations performed when a caption error was detected in operation 514 of method 500 (see FIG. 5).

A caption error may be generated (operation 602). The caption error may be logged (operation 604) along with a timestamp indicative of the caption error. The logging of caption error data may be performed using a database, such as ETMP database 234 and/or database server 190 (see FIGS. 1 and 2). A portion of the baseband video signal and the audio track prior to and/or including the caption error may be logged (operation 606). By logging caption error data, including audio and/or video data, prior to the caption error, data for determining the cause of the caption error may be recorded. An email notification of the caption error may be sent to a specified address (operation 608). The email notification may include details of the caption error and an indication to logged caption error data.

Referring now to FIG. 7, a block diagram illustrating selected elements of an embodiment of ETMP configurator/executor 700 is presented. ETMP configurator/executor 700 may represent ETMP configurators/executors 260 and/or ETMP executor 270 (see FIG. 2) in various embodiments. As shown in FIG. 2, multiple instances of ETMP configurator/executor 700 may be configured for use in conjunction with a given ETMP 170 facility. The elements of ETMP configurator/executor 700 depicted in FIG. 7 may be physically implemented as a single, self-contained device. In certain implementations, ETMP configurator/executor 700 may alternatively be implemented using a number of different devices that are physically separated, but coupled together for centralized control. It is noted that ETMP configurator/executor 700 may include additional components, such as a power supply and a cooling element, which have been omitted from FIG. 7 for clarity. As shown in FIG. 7, ETMP configurator/executor 700 may operate in conjunction with ETMP 170 (see also FIGS. 1 and 3) to execute the methods and operations described herein. In certain embodiments, ETMP configurator/executor 700 may represent a virtualized computing environment, wherein certain elements depicted in FIG. 7 are shared or represent virtualized components.

In the embodiment depicted in FIG. 7, ETMP configurator/executor 700 includes processor 701 coupled via shared bus 702 to storage media collectively identified as memory media 710. ETMP configurator/executor 700, as depicted in FIG. 7, further includes network adapter 720 that interfaces ETMP configurator/executor 700 to a network (not shown in FIG. 7), such as ETMP network 240 (see FIG. 2). In embodiments suitable for use with ETMP 170, ETMP configurator/executor 700, as depicted in FIG. 7, may include peripheral adapter 706, which provides connectivity for the use of input device 708 and output device 709. Input device 708 may represent a device for user input, such as a keyboard or a mouse, or even a video camera. Output device 709 may represent a device for providing signals or indications to a user, such as loudspeakers for generating audio signals.

ETMP configurator/executor 700 is shown in FIG. 7 including display adapter 704 and further includes a display device or, more simply, a display 705. Display adapter 704 may interface shared bus 702, or another bus, with an output port for one or more displays, such as display 705. Display 705 may be implemented as a liquid crystal display screen, a computer monitor, a TV or the like. Display 705 may comply with a display standard for computer monitors and/or TV displays. Standards for computer monitors include analog standards such as VGA, XGA, etc., or digital standards such as DVI and HDMI, among others. A TV display may comply with standards such as NTSC, PAL, or another suitable standard. Display 705 may include one or more integrated speakers to play audio content.

Memory media 710 encompasses persistent and volatile media, fixed and removable media, and magnetic and semiconductor media. Memory media 710 is operable to store instructions, data, or both. Memory media 710 as shown includes sets or sequences of instructions 724-2, namely, an operating system 712, ETMP closed caption verification 720, as well as data including video images 716 and audio data 718. Operating system 712 may be a UNIX or UNIX-like operating system, a Windows® family operating system, or another suitable operating system. Instructions 724 may also reside, completely or at least partially, within processor 701 during execution thereof. It is further noted that processor 701 may be configured to receive instructions 724-1 from instructions 724-2 via shared bus 702. ETMP closed caption verification 720 may represent an application configured to execute at least certain portions of method 500 and/or method 600 (see FIGS. 5, 6). Video images 716 may represent image data stored when acquiring a baseband video signal using frame acquirer 326. Audio data 718 may represent audio signals from an audio portion of a baseband video signal acquired using frame acquirer 326.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A multimedia content monitoring method, comprising:
   accessing a video signal and a corresponding audio signal output by a multimedia handling device;
   monitoring the video signal for a change in a closed caption text and responsive to detecting a change in the closed caption text:
   determining a time period corresponding to an appearance of a first text string within the video signal;
   buffering a specified interval of the audio signal before and after the appearance of the first text string;
   converting speech content occurring in the audio signal during the specified interval into a second text string;
   comparing the first text string and the second text string; and
   responsive to determining that the first text string and the second text string match, certifying that a closed caption was presented correctly.

2. The method of claim 1, wherein determining the time period includes determining individual video frames of the video signal containing the first text string.

3. The method of claim 1, wherein the first text string is a closed caption, and wherein the time period is indicative of a portion of the video signal during which the closed caption displays.

4. The method of claim 1, further comprising:
determining a degree of matching between the first text string and the second text string; and
when the degree of matching falls below a predetermined threshold, generating a caption error.

5. The method of claim 4, further comprising:
logging the caption error, including logging a time of the caption error with respect to the video signal.

6. The method of claim 4, further comprising:
logging a portion of the video signal and the speech content corresponding to the caption error.

7. The method of claim 1, further comprising:
sending an electronic notification of the caption error.

8. A computerized multimedia content monitoring system, comprising:
a processor; and
a computer readable memory medium, accessible to the processor, including processor executable program instructions that, when executed by the processor, cause the processor to perform operations including:
accessing a video signal and a corresponding audio signal output by a multimedia handling device;
monitoring the video signal for a change in a closed caption text and responsive to detecting a change in the closed caption text:
determining a time period corresponding to an appearance of a first text string within the video signal;
buffering a specified interval of the audio signal before and after the appearance of the first text string;
converting speech content occurring in the audio signal during the specified interval into a second text string;
comparing the first text string and the second text string; and
responsive to determining that the first text string and the second text string match, certifying that a closed caption was presented correctly.

9. The system of claim 8, wherein the operations include:
sending a first network command to power on the multimedia handling device via a network-based power controller;
sending a second network command to select an output channel of the multimedia handling device via a network-based remote control; and
sending a third network command to route the output channel to a frame acquirer.

10. The system of claim 8, wherein the operations include:
determining a degree of matching between the first text string and the second text string; and
when the degree of matching falls below a predetermined threshold, generating a caption error.

11. The system of claim 10, wherein the threshold is determined at least in part based on a number of matching words.

12. The system of claim 10, wherein the threshold is determined at least in part based on an accuracy associated with extracting the second text string from speech content in the time period of the audio signal.

13. The system of claim 10, wherein the operations include:
logging the caption error along with a timestamp; and
logging a portion of the baseband video signal and the audio track corresponding to the caption error.

14. The system of claim 10, wherein the operations include:
sending, to a registered entity, a notification of the caption error.

15. A computer readable memory device including processor executable program instructions for monitoring output from a multimedia content distribution network, wherein the program instructions, upon execution by the processor, cause the processor to performs operations comprising:
accessing a video signal and a corresponding audio signal output by a multimedia handling device;
monitoring the video signal for a change in a closed caption text and responsive to detecting a change in the closed caption text:
determining a time period corresponding to an appearance of a first text string within the video signal;
buffering a specified interval of the audio signal before and after the appearance of the first text string;
converting speech content occurring in the audio signal during the specified interval into a second text string;
comparing the first text string and the second text string; and
responsive to determining that the first text string and the second text string match, certifying that a closed caption was presented correctly.

16. The computer readable memory device of claim 15, wherein the operations include:
sending a first network command to power on the multimedia handling device via a network-based power controller;
sending a second network command to select an output channel of the multimedia handling device via a network-based remote control; and
sending a third network command to route the output channel to a frame acquirer.

17. The computer readable memory device of claim 15, wherein the operations include:
when a degree of matching falls below a predetermined threshold, generating a caption error;
logging the caption error along with a timestamp; and
sending a notification of the caption error.

18. The computer readable memory device of claim 17, wherein the operations include:
logging a portion of the video signal and the audio signal corresponding to the caption error.

19. The computer readable memory device of claim 17, wherein the operations include:
when the degree of matching is greater than the threshold, certifying that the closed caption is accurately presented on the multimedia handling device.

20. The computer readable memory device of claim 17, wherein the threshold is determined at least in part based on a number of matching words.

* * * * *